(12) United States Patent
Yamamuro (10) Patent No.: US 6,738,952 B1
(45) Date of Patent: May 18, 2004

(54) NAVIGATIONAL MAP DATA OBJECT SELECTION AND DISPLAY SYSTEM

(75) Inventor: Noriko Yamamuro, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/145,174

(22) Filed: Sep. 1, 1998

(30) Foreign Application Priority Data

Sep. 2, 1997 (JP) .............................. 9-237074
Sep. 2, 1997 (JP) .............................. 9-237075

(51) Int. Cl.$^7$ .......................... G06F 17/00; G06F 17/21; G01C 21/00
(52) U.S. Cl. ...................... 715/530; 715/531; 715/532; 701/201; 701/202; 701/212
(58) Field of Search ................................. 701/201–212; 707/530, 5, 532, 2, 3; 704/9; 715/530–532

(56) References Cited

U.S. PATENT DOCUMENTS

| | | | | |
|---|---|---|---|---|
| 4,677,450 A | * | 6/1987 | Ito et al. ....................... | 701/212 |
| 5,191,532 A | * | 3/1993 | Moroto et al. ............... | 701/201 |
| 5,231,584 A | * | 7/1993 | Nimura et al. ............... | 701/202 |
| 5,317,686 A | * | 5/1994 | Salas et al. .................. | 715/503 |
| 5,469,355 A | * | 11/1995 | Tsuzuki .......................... | 704/9 |
| 5,649,221 A | * | 7/1997 | Crawford et al. ............ | 707/532 |
| 5,715,446 A | * | 2/1998 | Kinoshita et al. ............ | 707/5 |
| 5,765,123 A | * | 6/1998 | Nimura et al. ............... | 701/208 |
| 6,021,405 A | * | 2/2000 | Celis et al. ..................... | 707/2 |
| 6,278,992 B1 | * | 8/2001 | Curtis et al. .................... | 707/3 |

FOREIGN PATENT DOCUMENTS

| | | |
|---|---|---|
| EP | 633452 A1 | 1/1995 |
| EP | 789224 A2 | 8/1997 |
| JP | 54-98154 | 8/1979 |
| JP | 56-19135 | 2/1981 |
| JP | 62-151885 | 7/1987 |
| JP | 4-127371 | 4/1992 |
| JP | 5-108004 | 4/1993 |
| JP | 7-037199 | 2/1995 |
| JP | 7-218275 | 8/1995 |
| JP | 7-295994 | 11/1995 |
| JP | 8-106457 | 4/1996 |
| JP | 9-97266 | 4/1997 |

OTHER PUBLICATIONS

Hsin, Victor J.K. et al., Modelling concepts for intelligent vehicle highway systems (IVHS) applications, ACM Proceedings of the conference on Winter simulation, pp.1201–1209.*

Map–Mix Tokyo 23 WARDS, p. 119 of Nikkei WinPC, Mar. 1996.

* cited by examiner

Primary Examiner—Sanjiv Shah
Assistant Examiner—William L. Bashore
(74) Attorney, Agent, or Firm—Harness, Dickey & Pierce, PLC (57) ABSTRACT

A navigational map data object selection system having a data retrieving and displaying system, and a storage device which stores a plurality of names as body word sets and stores, as duplicate word sets, parts of the body words. A retrieving character string is specified through a specifying device. A retrieving device retrieves both body word sets and duplicate word sets including a character string that coincides with the retrieving character string. The display device displays the body word sets retrieved by the retrieving device and the body word sets corresponding to duplicate word sets retrieved by the retrieving device. When the body word set and duplicate word sets are retrieved, a selecting device selects only one word set. The display device only displays the selected one word set.

36 Claims, 5 Drawing Sheets

| AMBIGUOUS RETRIEVAL DATA | BODY WORD SET | ATTRIBUTE | NUMBER OF OVERLAPPING CHARACTERS |
|---|---|---|---|
| ABCD | ABCDE ABCMN ABCD | DUPLICATE | 0 |
| ABCDE | EFG ABCDE | DUPLICATE | 0 |
| ABCDE ABCMN ABCD | ABCDE ABCMN ABCD | BODY | 4 |
| ABCDE XYZ | ABCDE XYZ | BODY | 0 |
| ABCMN ABCD | ABCDE ABCMN ABCD | DUPLICATE | 3 |
| EFG ABCDE | EFG ABCDE | BODY | 0 |
| XYZ | ABCDE XYZ | DUPLICATE | 0 |

FIG. 2A

- ABCDE ABCMN ABCD
- ABCDE XYZ
- EFG ABCDE

FIG. 2B

- ABCDE ABCMN ABCD (BODY WORD SET)
- ABCMN ABCD (DUPLICATE WORD SET)
- ABCD (DUPLICATE WORD SET)

FIG. 2C

- ABCDE XYZ (BODY WORD SET)
- XYZ (DUPLICATE WORD SET)

FIG. 2D

- EFG ABCDE (BODY WORD SET)
- ABCDE (DUPLICATE WORD SET)

NAVIGATIONAL MAP DATA OBJECT SELECTION AND DISPLAY SYSTEM

CROSS REFERENCE TO RELATED APPLICATION

This application is based upon and claims the benefit of priority of Japanese Patent Applications No. H.9-237074 and No. H.9-237075 both filed on Sep. 2, 1997, the contents of which are incorporated herein by reference.

BACKGROUND OF THE INVENTION

1. Field of the Invention

The present invention relates to a data retrieving and displaying system and more particularly to a system for ambiguously retrieving and displaying a destination or a name of an objective in a navigation system.

2. Description of Related Art

A navigation system mounted in a car or the like for providing a guidance by displaying on a map a present position detected by the GPS (Global Positioning System) or the like, a destination or a position of an objective (building, facility, park and the like) set by a user and a route from the present position to the destination or the objective is widely used.

In such a navigation system, there is a case when the user is unable to specify the destination or the position of the objective on the map in setting the destination or the objective because the user is unfamiliar with the locality around the destination or the objective even though the user knows the name of the destination or the objective. Then, in order to enable the user to set the destination or the objective even in such a case, a data retrieving system which can retrieve positional data of the destination or the objective on the map using the name of the destination or the objective inputted by the user has been put into practical use.

The name of the destination or the objective is often called not by its official name but by its brief name in general. For instance, when an official name of a building is "○X○○-○X Building", there is a case when it is abbreviated and called as "○X Building". Therefore, in order to enable the user to set the destination or the objective even when the user does not know the official name thereof, there is the data retrieving system provided with a function of specifying the destination or the objective by retrieving not only the official name but also its brief name by utilizing ambiguous retrieval and by listing those names on a display to let the user select a desired name among them.

In the conventional data retrieving system being not provided with the function of the ambiguous retrieval, for instance, a name of a destination or an objective "ABCDE ABCMN" cannot be retrieved unless input is made sequentially from the head character of the head word ("ABCDE") like "A-B-C-D-E- -A-B- . . . ".

In contrary to that, in the data retrieving system provided with the function of the ambiguous retrieval, the name of "ABCDE ABCMN" can be retrieved even when input is made sequentially from the head character of the second word ("ABCMN") like "A-B-C-M- . . . ".

In the data retrieving system utilizing the ambiguous retrieval, not only the name "ABCDE ABCMN" is registered as a body word set but also the second word ("ABCMN") of the name is also registered as a duplicate word set. The duplicate word set is registered in association with the body word set.

According to the data retrieving system utilizing the ambiguous retrieval, even when the character string indicating the official name is not inputted, body word sets and duplicate word sets including the inputted character string are retrieved and displayed abreast on a display. For instance, when the official name "ABCDE ABCMN" is to be retrieved and when three characters of "ABC" are inputted as a retrieving character string, both of the body word sets and the duplicate word sets including the retrieving character string are retrieved. Accordingly, not only the body word sets retrieved but also the body word sets associated with the duplicate word sets retrieved are displayed abreast on the display. That is, although the duplicate word sets including the retrieving character string are retrieved, the duplicate word sets themselves are not displayed and the body word sets associated with the duplicate word sets are displayed.

At this time, in the prior art data retrieving system utilizing the ambiguous retrieval, there is a case when the same names are displayed in duplication on the display depending on the retrieving character string. As a result, since a number of names displayed on the display increases due to the duplicate display, it is hard for the user to discriminate a desired name and it takes time to select the desired name among the plurality of names.

Further, the prior art data retrieving system utilizing the ambiguous retrieval has another problem that when there exist many objectives having the same name, it is very difficult for the user to select a desired objective because the system merely lists all of them on the display. For instance, when five-hundred chain stores having a name of "○○△" are registered in the data retrieving system and when the user inputs the name of "○○△", the five hundreds of same names "○○△" are just displayed on the display. As a result, the user is unable to distinguish the desired objective.

Further, when the user inputs the name "○○△" to retrieve a name "○○△X" which is similar to the name "○○△", the name "○○△X" is displayed together with the five-hundred names of "○○△". Therefore, it is very difficult for the user to find and select the name "○○△X" among such a large number of names displayed on the display.

SUMMARY OF THE INVENTION

Accordingly, it is a primary object of the present invention to provide a data retrieving and displaying system in which no same name is displayed in duplication in ambiguous retrieval.

A secondary object of the present invention is to provide a data retrieving and displaying system which allows desired data to be simply and readily retrieved among data having the same name.

In order to achieve the first object of the present invention, a data retrieving and displaying system according to a first aspect of the present invention comprises a storage device, a specifying device, a retrieving device, a display device, a selecting device and a display inhibiting device. The storage device stores a plurality of names as body word sets and stores, as duplicate word sets, parts of the body word sets. Ambiguous retrieval data are composed of body word sets and duplicate word sets for the plurality of names. A retrieving character string is specified through the specifying device. The retrieving device retrieves both body word sets and duplicate word sets including a character string that coincides with the retrieving character string from the ambiguous retrieval data. The display device displays the body word sets retrieved by the retrieving device and the body word sets in association with the duplicate word sets retrieved by the retrieving device. When there are the body word set and the duplicate word sets corresponding to an identical name among the body word sets and the duplicate word sets retrieved by the retrieving device, the selecting device selects only one among the body word set and the duplicate word sets corresponding to the identical name. Further, when there are the body word set and the duplicate word sets corresponding to the identical name, the display device inhibits the remaining of the body word set and duplicate word sets except the one selected by the selecting device from being displayed on the display device.

Therefore, according to the present invention, when the body word set and the duplicate word sets duplicated therefrom, which correspond to the identical name, are stored in the storage device, even though the ambiguous retrieval is performed by any retrieving character string, the identical name is not displayed in duplication. Accordingly, a user can readily distinguish and select a desired name without taking time when selecting the desired name among names (body word sets) tabularly displayed on the display device.

The duplicate word sets may be composed of remaining words of when words are excluded from the body word set one by one from a head word thereof. For example, when the body word set is composed of two words "ABCDE ABCMN", the duplicate word set may be composed of one word "ABCMN" because the duplicate word set is formed by excluding a word one by one from a head word of the body word set. Accordingly, when a name "ABCDE ABCMN" is to be retrieved, it may be retrieved even when input is made sequentially from the head character of the second word ("ABCMN") like "A-B-C-M . . . ", whereby the ambiguous retrieval can be utilized.

The retrieving device can retrieve the body word sets and the duplicate word sets including the character string that coincides with the retrieving character string from the ambiguous retrieval data by comparing each character composing the retrieving character string with each character composing each of the body word sets and the duplicate word sets in the ambiguous retrieval data one by one from their head character. Thereby, both the body word sets and the duplicate word sets including a character string that coincides with the retrieving character string may be retrieved steadily.

Preferably, the display device displays body word sets as they are when the body word sets are retrieved by the retrieving device. Also, the display device displays body word sets corresponding to duplicate word sets when the duplicate word sets are retrieved by the retrieving device. Thereby, the display device can display the body word set regardless of whether retrieved by the retrieving device is the body word set or duplicate word set.

Preferably, when the storage device stores a body word set and one or more duplicate word set corresponding to an identical name, in a predetermined order, the number of overlapping characters in the body and duplicate word sets is also stored in association with each of the body and duplicate word sets. The number of overlapping characters represents the number of characters of an arbitrary one of the body and duplicate word sets that match characters composing another of the body and duplicate word sets stored before the arbitrary one, from a head character thereof. When a plurality of word sets corresponding to the identical name are retrieved by the retrieving device, the selecting device selects a word set whose number of overlapping characters is smaller than the number of characters of the retrieving character string specified through the specifying device among the plurality of word sets.

As a result, even if the plurality of word sets corresponding to the identical name are retrieved by the retrieving device, only one word set can be selected from the plurality of word sets by the selecting device.

In order to achieve the above-mentioned second object of the present invention, a data retrieving and displaying system according to a second aspect of the present invention comprises a storage device, a parent data specifying device, a first retrieving device, a counting device, a display device, a child data specifying device and a second retrieving device. The storage device stores a plurality of names of objectives as parent data and a plurality of characteristics of each of the objectives as child data. The characteristics of each of the objectives are stored in the storage device in association with the name of each of the objectives. The parent data specifying device specifies at least a part of the name of the objective. The first retrieving device retrieves the names of the objectives corresponding to the name specified by the parent data specifying device from the parent data. The counting device counts a number of identical names when the first retrieving device retrieves a plurality of identical names from the parent data. The display device displays both the identical name retrieved by the first retrieving device and the number of the identical names counted by the counting device. The child data specifying device specifies an attribute of the characteristics of the objective to be retrieved. The second retrieving device retrieves a characteristic of each of the objectives having the names retrieved by the first retrieving device in accordance with the attribute specified by the child data specifying device from the child data. Then, the characteristic of each of the objectives retrieved by the second retrieving device is displayed on the display device in correspondence with the name of each of the objectives.

Therefore, according to the second aspect of the present invention, when the plurality of identical names retrieved based on the name specified by the parent data specifying device are stored in the storage device, the first retrieving device retrieves the plurality of identical names from the parent data, the counting device counts the number of the identical names and the display device displays the identical name and its number. Therefore, the user can know the number of the objectives having identical names.

Then, the second retrieving device retrieves the characteristic of each of the objectives having the identical name in accordance with the attribute specified by the child data specifying device from the child data, and the display device displays the characteristic of each of the objectives. Therefore, when there exist the plurality of objectives having the identical name, the characteristic of each of the objectives belonging to the same attribute among the plurality of characteristics of each of the objectives is tabularly displayed on the display device. Therefore, the objectives having the identical name can be distinguished by the displayed characteristics thereof. As a result, the objectives having the identical name can be distinguished and a desired objective can be simply and readily selected.

The first retrieving device may retrieve names of objectives equivalent to the name specified by the parent data specifying device and names of objectives including the specified name from the parent data. Thereby, even when an official name of an objective to be selected is unknown, a desired objective can be retrieved steadily because the names of objectives equivalent to the specified name and the names of objectives including the specified name are tabularly displayed on the display means.

It is noted that in the embodiments of the present invention described below, the characteristics of an objective stored as the child data corresponds to an addresses, map position data, and so on of the objective.

The specific nature of the invention, as well as other objects, uses and advantages thereof, will clearly appear from the following description and from the accompanying drawings.

DESCRIPTION OF PREFERRED EMBODIMENTS

[First Embodiment]

A first embodiment in which the present invention is embodied in a car navigation system will be explained below with reference to the drawings.

Figure 1:
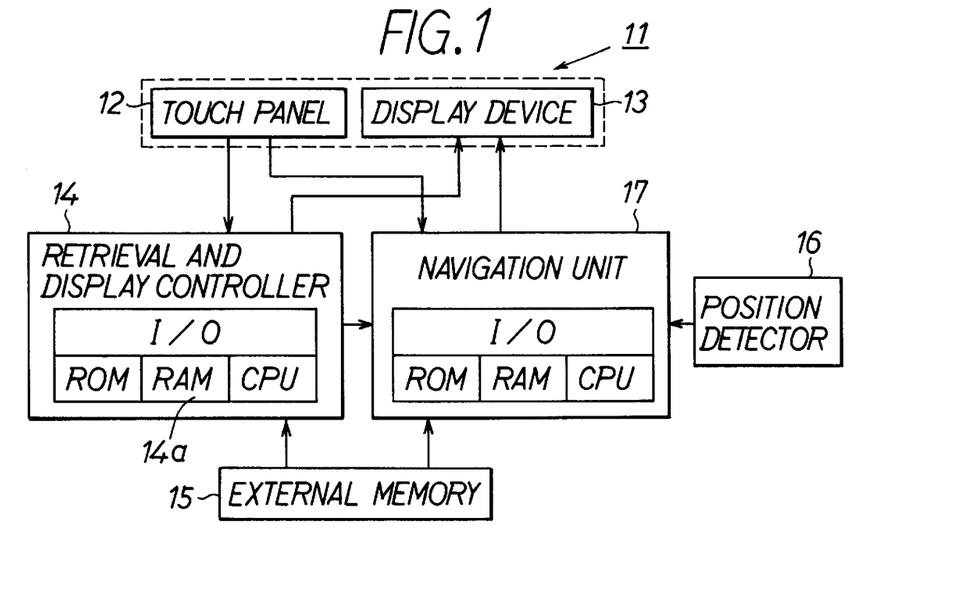
FIG. 1 is a block diagram showing a structure of a data retrieving and displaying system according to a first embodiment.

In FIG. 1, the car navigation system 11 mounted within an interior of a vehicle, comprises a touch panel 12, a display 13, a retrieval and display controller 14, an external memory 15, a position detector 16 and a navigation unit 17.

The touch panel 12 is laminated and integrated with the display 13. While there are various types of touch panels such as a pressure sensitive type, an electromagnetic induction type, an electrostatic capacitive type and a combination type thereof, any one of them may be used. There are also various displays such as a liquid crystal display, a plasma display and a CRT, any one of them may be used as the display 13.

The touch panel 12 functions as a control switch for the retrieval and display controller 14 and the navigation unit 17. A mode selection key, a keyboard, a list key for displaying on the display 13 a result of ambiguous retrieval processing performed for retrieving a name of a destination or an objective (described later), a name selection key and others are provided on an input plane of the touch panel 12 (not shown) by the display 13.

The retrieval and display controller 14 is composed of a known microcomputer having an I/O circuit, a CPU, a ROM and a RAM 14a. Electrical power is supplied to the retrieval and display controller 14 from a battery of the vehicle (not shown) when a power switch (not shown) of the car navigation system 11 is turned on. Then, based on a signal from the touch panel 12 inputted via the I/O circuit, the retrieval and display controller 14 sequentially executes programmed instructions stored in the built-in ROM or the external memory 15. That is, the retrieval and display controller 14 performs ambiguous retrieval processing for ambiguously retrieving a name of a destination or an objective and displays the result of the ambiguous retrieval processing on the display 13.

The position detector 16 comprises a geomagnetic sensor, a gyroscope, a steering turn sensor, wheel speed sensors, a GPS receiver and others and detects the present position of the vehicle provided with the car navigation system 11 by the known technology.

The navigation unit 17 is composed of a known microcomputer having an I/O circuit, a CPU, a ROM and a RAM. Electrical power is supplied to the navigation unit 17 from the battery of the vehicle when the power switch of the car navigation system 11 is turned on. Then, based on the signal from the touch panel 12 inputted via the I/O circuit, the navigation unit 17 sequentially executes programmed instructions stored in the built-in ROM or the external memory 15. That is, the navigation unit 17 selects the optimum route from the present position detected by the position detector 16 to the destination or the objective set by the retrieval and display controller 14 by using a known technology such as Dikstra method. The navigation unit 17 also displays the present position detected by the position detector 16 and the optimum route from the present position to the destination or the objective on the display 13 by making reference to map data stored in the external memory 15.

A data table created by associating names of destinations or objectives (buildings, facilities, parks and the like) with positional data thereof on the map is stored in the external memory 15. The map data and the programmed instructions of the retrieval and display controller 14 and the navigation unit 17 are also stored in the external memory 15. An ambiguous retrieval data table described later is also stored in the external memory 15.

It is to be noted that, while an optical disk (e.g., CD-ROM and DVD), a magneto-optical disk (e.g., MD), a phase change disk and the like are used for the external memory 15 in general because an amount of data to be stored is large, any storage medium such as a semiconductor memory, a hard disk and a data card (e.g., IC card and magnetic card) may be used as long as it can store necessary data.

Further, electrical power is supplied to the touch panel 12, the display 13, the external memory 15 and the position detector 16 from the battery as well when the power switch of the car navigation system 11 is turned on.

Next, the method for creating the ambiguous retrieval data table will be explained.

Figure 2A:
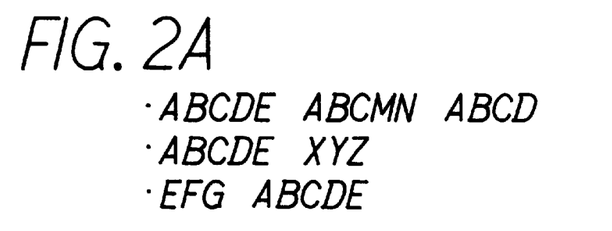
FIGS. 2A through 2D are explanatory charts for explaining a method for creating ambiguous retrieval data in the first embodiment.
Figure 2B:
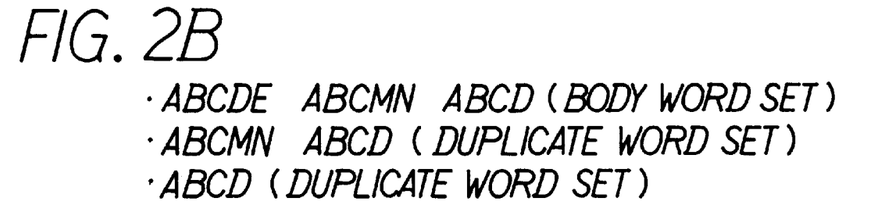

Assume that names of three destinations or objectives of "ABCDE ABCMN ABCD", "ABCDE XYZ" and "EFG ABCDE" are stored in the external memory 15 as shown in FIG. 2A for example. As for the name composed of three words "ABCDE ABCMN ABCD", two duplicate word sets are duplicated as shown in FIG. 2B. That is, a first duplicate word set is composed of the remaining words ("ABCMN ABCD") of when the first word ("ABCDE") is excluded from the three words (body word set) which are composed of all the words representing its official name. A second duplicate word set is composed of the remaining word ("ABCD") of when the first and second words ("ABCDE" and "ABCMN") are excluded from the body word set.

Figure 2C:
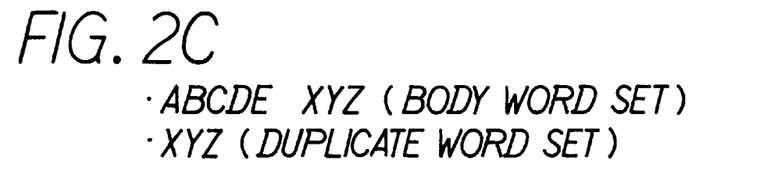

As for the name composed of two words of "ABCDE XYZ", only one duplicate word set is duplicated as shown in FIG. 2C. That is, the duplicate word set is composed of the remaining word ("XYZ") of when the first word ("ABCDE") is excluded from the body word set which is composed of all the words representing the official name.

Figure 2D:
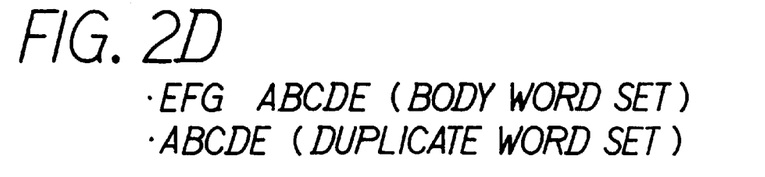

Further, as for the name composed of two words of "EFG ABCDE", one duplicate word set is duplicated as shown in FIG. 2D. That is, the duplicate word set is composed of the remaining word ("ABCDE") of when the first word ("EFG") is excluded from the body word set which is composed of all the words representing its official name.

In this way, from the name composed of n words, n−1 duplicate word sets are duplicated, including a duplicate word set composed of the remaining words of when the first word is excluded from the body word set composed of all of n words composing the official name, a duplicate word set composed of the remaining words of when the first and second words are excluded from the body word set, a duplicate word set composed of the remaining words of which the first through third words are excluded from the body word set, . . . and a duplicate word set composed of the last word of the body word set.

Figure 3:
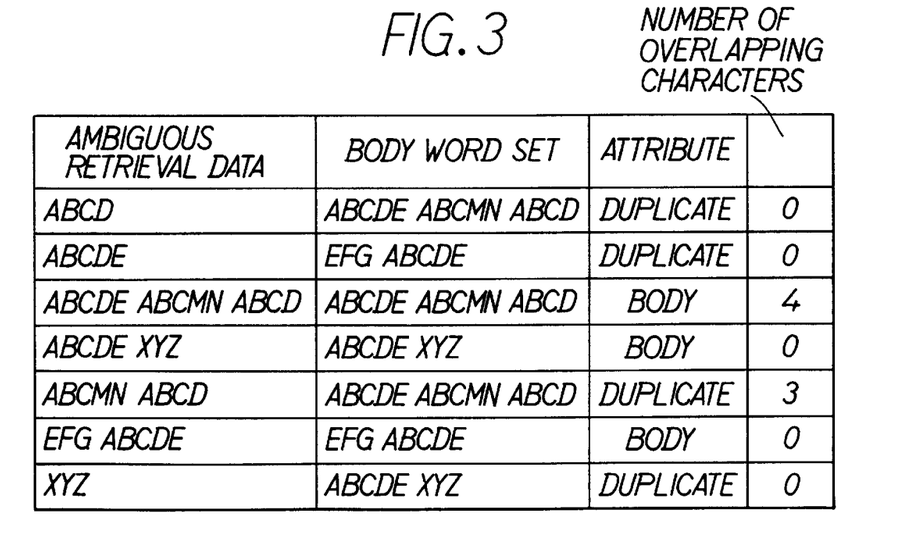
FIG. 3 is a diagrammatic table showing a storage format of an ambiguous retrieval data table in an external memory according to the first embodiment.

FIG. 3 is a diagrammatic table showing a storage format of an ambiguous retrieval data table of the external memory 15. Ambiguous retrieval data composed of the body word sets and the duplicate word sets produced as shown in FIGS. 2B through 2D are stored while being sorted in alphabetic order. Then, the original body word set thereof, the attribute for discriminating between the body word set and the duplicate word set and a number of overlapping characters are stored in association with each of the body word sets and the duplicate word sets.

The number of overlapping characters represents the number of characters of an arbitrary one of the body and duplicate word sets that match characters composing another of the body and duplicate word sets stored in the ambiguous retrieval data table before the arbitrary one, from a head character thereof, among the body word set and one or more duplicate word sets corresponding to an identical name. It is noted that, the number of overlapping characters of first one of the body and duplicate word sets which is stored at the top on the list in the ambiguous retrieval data table among the body and duplicate word sets corresponding to the identical name is zero.

For instance, as for the name "ABCDE ABCMN ABCD", the body word set and two duplicate word sets ("ABCMN ABCD" and "ABCD") are stored as ambiguous retrieval data. When the body data set and two duplicate word sets are sorted in alphabetic order, they are rearranged in the order of "ABCD"—"ABCDE ABCMN ABCD"—"ABCMN ABCD". Therefore, the second duplicate word set "ABCD" is stored at the top on the list. The body word set "ABCDE ABCMN ABCD" and the first duplicate word set "ABCMN ABCD" are stored in the ambiguous retrieval data table in that order. Accordingly, the number of overlapping characters of the second duplicate word set "ABCD" is zero.

The second duplicate word set "ABCD" corresponds to the word set stored just before the body word set "ABCDE ABCMN ABCD" among the body and duplicate word sets corresponding to the identical name. Characters composing the body word set "ABCDE ABCMN ABCD" that match characters composing the second duplicate word set "ABCD" from the head character thereof are four characters of "A", "B", "C" and "D". Therefore, the number of overlapping characters of the body word set "ABCDE ABCMN ABCD" is four.

The body word set "ABCDE ABCMN ABCD" corresponds to the word set stored just before the first duplicate word set "ABCMN ABCD" among the body and duplicate word sets corresponding to the identical name. Characters composing the first duplicate word set "ABCMN ABCD" that match characters composing the body word set "ABCDE ABCMN ABCD" from the head character thereof are three characters of "A", "B" and "C". Therefore, the number of overlapping characters of the first duplicate word set "ABCMN ABCD" is three.

Similarly to that, as for the name "EFG ABCDE", the body word set and one duplicate word set ("ABCDE") are stored as ambiguous retrieval data. When these two word sets are sorted in alphabetic order, they are rearranged in the order of "ABCDE"—"EFG ABCDE". Therefore, the duplicate word set "ABCDE" is stored at the top on the list in the ambiguous retrieval data table and the body word set "EFG ABCDE" is stored next. Accordingly, the number of overlapping characters of the duplicate word set "ABCD" is zero.

Although the duplicate word set "ABCD" is stored just before the body word set "EFG ABCDE" in the list, characters composing the body word set "EFG ABCDE" do not match characters composing "ABCDE", from the head character thereof. Therefore, the number of overlapping characters of the body word set "EFG ABCDE" is zero.

Next, the ambiguous retrieval processing executed by the retrieval and display controller 14 will be explained in detail by using a flowchart shown in FIG. 4 and by referring to the diagrammatic table shown in FIG. 3.

When the user selects a mode for ambiguously retrieving a name of a destination or an objective among menus displayed on the display 13 by the mode selection key on the touch panel 12 after turning on the power switch of the car navigation system 11, the retrieval and display controller 14 executes the following processing.

Figure 4:
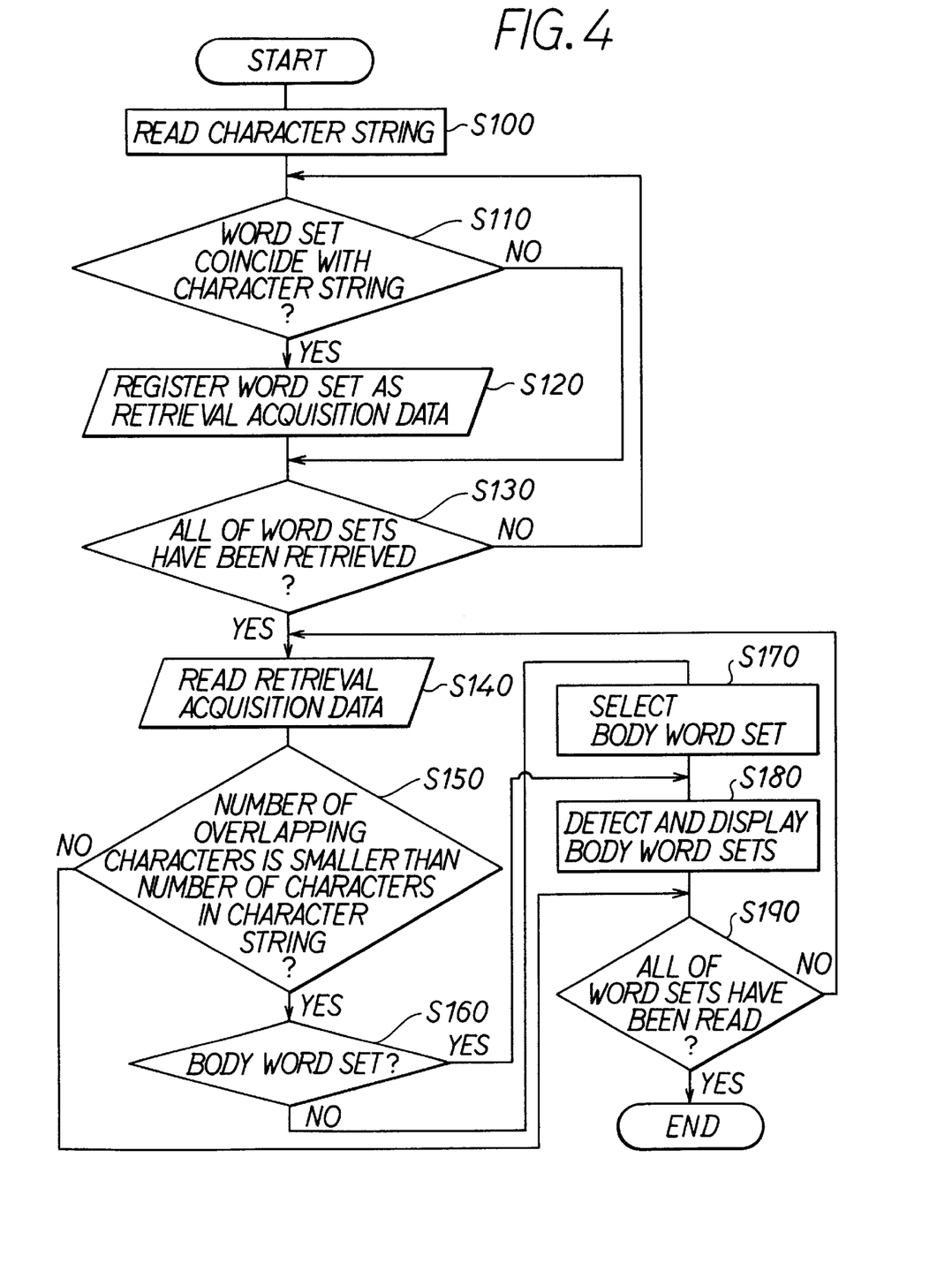
FIG. 4 is a flowchart for explaining the operation of the first embodiment.

As shown in FIG. 4, a character string of the name representing the destination or the objective (hereinafter referred to as a retrieving character string) inputted by the user is read in at Step 100. That is, the character string of the name representing the destination or the objective which the user types by touching the respective keys of the keyboard provided on the touch panel 12 is read by the retrieval and display controller 14 as an output signal of the touch panel 12. It is determined based on a signal from a list key provided on the touch panel 12 whether or not the input of the retrieving character string has been finished. That is, when the user touches the list key after inputting the desired character string, it is considered that the input of the retrieving character string has been finished and the inputted character string is read as the retrieving character string. When the user touches the list key after inputting a character string composed of two characters of "AB" for example, "AB" is read as a retrieving character string. Also, when the user touches the list key after inputting a character string composed of four characters of "ABCD", "ABCD" is read as a retrieving character string.

Next, in Step 110, the ambiguous retrieval data table of the external memory 15 is retrieved to determine whether or not each of the body word sets and the duplicate word sets stored in the ambiguous retrieval data table coincides with the retrieving character string by comparing respective characters of each of the body word sets and the duplicate word sets with respective characters composing the retrieving character string sequentially one by one from a head character. When any one of the body word sets and the duplicate word sets coincides with the retrieving character string, processing advances to Step 120. When on the other hand they do not coincide, processing advances to Step 130.

In Step 120, any one of the body word sets and the duplicate word sets which is determined to coincide with the retrieving character string in Step 110 is registered as retrieval acquisition data in the RAM 14a.

In Step 130, it is determined whether or not all of body word sets and the duplicate word sets stored in the ambiguous retrieval data table of the external memory 15 have been retrieved. When all of the body word sets and the duplicate word sets have been retrieved, processing advances to Step 140. When on the other hand all of the body word sets and the duplicate word sets have not been retrieved yet, processing returns to Step 110.

All of the body word sets and the duplicate word sets stored in the ambiguous retrieval data table of the external memory 15 can be retrieved, and all of the body word sets and the duplicate word sets including characters which coincide with the retrieving character string can be registered as the retrieval acquisition data in the RAM 14*a* by repeating the processing in Steps 110 through 130.

It is to be noted that the body word sets and the duplicate word sets are retrieved in the order as listed from the body word set or the duplicate word set stored at the top on the list in the ambiguous retrieval data table when retrieving the body word sets and duplicate word sets in Step 110. Then, the retrieval acquisition data are registered in the RAM 14*a* in Step 120 in the order as retrieved from the ambiguous retrieval data table.

Therefore, the body word sets and the duplicate word sets registered as the retrieval acquisition data in the RAM 14*a* are arranged in the same order as in the ambiguous retrieval data table of the external memory 15, i.e., arranged in alphabetic order.

For instance, when the retrieving character string is "ABC", five word sets of "ABCD", "ABCDE", "ABCDE ABCMN ABCD", "ABCDE XYZ" and "ABCMN ABCD" among the body word sets and the duplicate word sets shown in FIG. 3 are registered in the RAM 14*a* as retrieval acquisition data in this order.

When the retrieving character string is "ABCDE", three word sets of "ABCDE", "ABCDE ABCMN ABCD" and "ABCDE XYZ" among the body word sets and the duplicate word sets shown in FIG. 3 are registered in the RAM 14*a* as retrieval acquisition data in this order.

When the retrieval acquisition data is registered in the RAM 14*a* in Step 120, the characters of the word set included in the ambiguous retrieval data, its original body word set, the attribute of the word set and the number of overlapping characters of the word set are also stored in association with the corresponding word set for each of the body word sets and the duplicate word sets constituting the retrieval acquisition data.

Next, one word set included in the retrieval acquisition data is read from the RAM 14*a* in Step 140.

Then, it is determined whether or not the number of overlapping characters of the one word set read in Step 140 is smaller than the number of characters of the retrieving character string in Step 150. When the number of overlapping characters of the one word set is smaller than the number of characters of the retrieving character string, processing advances to Step 160 and when it is greater, processing advances to Step 190.

In Step 160, it is determined whether or not that the one word set of the retrieval acquisition data is a body word set based on the attribute thereof. When it is not a body word set (i.e., when it is a duplicate word set), processing advances to Step 170 and when it is a body word set, processing advances to Step 180.

In Step 170, the original body word set of the one word set (duplicate word set) read in Step 140 is detected. Next, the body word set of the one word set read in Step 140 is displayed on the display 13 in Step 180.

Next, it is determined in Step 190 whether or not all of the word sets included in the retrieval acquisition data registered in the RAM 14*a* have been read in Step 140. When all of the word sets included in the retrieval acquired data have been read, the ambiguous retrieving processing is finished. When on the other hand, all of the word sets included in the retrieval acquisition data have not been read yet, processing returns to Step 140.

The body word sets of the word sets whose numbers of overlapping characters are smaller than the number of characters of the retrieving character string among the word sets included in the retrieval acquisition data registered in the RAM 14*a* can be listed on the display 13 by repeating the processing of Steps 140 through 190.

The body word sets and the duplicate word sets included in the retrieval acquired data are read one by one from the RAM 14*a* in the order arrayed on the list from one word set stored at the top on the list in Step 140.

For instance, when the retrieving character string is "ABC" and when the five word sets of "ABCD", "ABCDE", "ABCDE ABCMN ABCD", "ABCDE XYZ" and "ABCMN ABCD" shown in FIG. 3 are registered in the RAM 14*a* as retrieval acquisition data in this order, the respective word sets are read in the order from "ABCD" at first, then "ABCDE", "ABCDE ABCMN ABCD", "ABCDE XYZ" and finally "ABCMN ABCD".

Because the retrieving character string is composed of three characters of "ABC", the word sets whose number of overlapping characters is smaller than the number of characters of the retrieving character string are three word sets of "ABCD", "ABCDE" and "ABCDE XYZ". Therefore, these three word sets are selected in Step 150.

Among these three word sets, because the two word sets of "ABCD" and "ABCDE" are duplicate word sets, their respective body word sets ("ABCDE ABCMN ABCD" and "EFG ABCDE") are detected in Step 170.

Then, the three body word sets of "ABCDE ABCMN ABCD", "EFG ABCDE" and "ABCDE XYZ" are displayed abreast on the display 13 by one each by repeating the processing of Steps 140 through 190.

At this time, as for the two word sets of "ABCDE ABCMN ABCD" and "ABCMN ABCD", their body word sets are not displayed on the display 13 because their numbers of overlapping characters are greater than the number of characters of the retrieving character string. Accordingly, no same body word set is displayed on the display 13 in duplication.

Further, when the retrieving character string is "ABCDE" and when the three word sets of "ABCDE", "ABCDE ABCMN ABCD" and "ABCDE XYZ" shown in FIG. 3 are registered in the RAM 14*a* as the retrieval acquisition data in this order for example, the respective word sets are read in the order from "ABCDE" at first, then "ABCDE ABCMN ABCD" and finally "ABCDE XYZ".

Because the retrieving character string has five characters of "ABCDE", the numbers of overlapping characters in the three word sets of "ABCDE", "ABCDE ABCMN ABCD" and "ABCDE XYZ" are all smaller than the number of characters of the retrieving character string. Therefore, all of the three word sets of "ABCDE", "ABCDE ABCMN ABCD" and "ABCDE XYZ" are determined that the number of overlapping characters is smaller than the number of characters of the retrieving character string in Step 150.

Among the three word set, because the word set of "ABCDE" is duplicate data, its body word set ("EFG ABCDE") is detected in Step 170.

Then, the three body word sets of "EFG ABCDE", "ABCDE ABCMN ABCD" and "ABCDE XYZ" are displayed abreast on the display 13 by one each by repeating the processing of Steps 140 through 190.

Next, the retrieval and display controller 14 allows the user to select a desired body word set among the body word sets listed on the display 13 by the above-mentioned ambiguous retrieving processing by the operation of the name selection key on the touch panel 12.

Then, the retrieval and display controller 14 retrieves positional data on a map corresponding to the body word set (name of the destination or the objective) selected by the user from the data table stored in the external memory 15 and displays the position on the map of the destination or the objective on the display 13 based on the positional data.

The map positional data of the destination or the objective set by the retrieval and display controller 14 as described above is transferred to the navigation unit 17. Then, the navigation unit 17 selects the optimum route from the present position detected by the position detector 16 to the position of the destination or the objective thus set and displays the map around the present position, the optimum route from the present position to the destination or the objective and others on the display 13 by making reference to the map data stored in the external memory 15.

As described above in detail, according to the car navigation system 11 of the present embodiment, no same name (body word set) is displayed on the display 13 in duplication even when the ambiguous retrieval is performed by any retrieving character string when body word set and one or more duplicate word sets duplicated therefrom corresponding to an identical same name are stored in the ambiguous retrieval data table of the external memory 15. Accordingly, the user can distinguish a desired name readily and can select it readily without taking time when selecting it among the names (body word sets) tabularly displayed on the display 13.

It is noted that the present invention is not limited only to the above-mentioned embodiment and may be embodied as described below while attaining the same operation and effect with the above-mentioned embodiment.

(1) In the above-described embodiment, it is considered that the input of the retrieving character string has been finished when the user touches the list key after inputting a desired character string. After that, the ambiguous retrieving processing is performed to display body word sets of the word sets included in the retrieval acquisition retrieved based on the retrieving character string. However, every time when the user inputs a character the ambiguous retrieving processing may be performed by setting the inputted character string as a retrieving character string. In this case, the number of characters of the inputted character string is increased one by one in response to the user's operation. When word sets which are stored as the retrieval acquisition data and retrieved based on the retrieving character string are narrowed down to a predetermined number of word sets (e.g. three word sets), the body word sets of the retrieved word sets may be displayed.

For instance, when the user inputs a character of "A", the five word sets of "ABCD", "ABCDE", "ABCDE ABCMN ABCD", "ABCDE XYZ" and "ABCMN ABCD" among the body word sets and the duplicate word sets included in the ambiguous retrieval data shown in FIG. 3 are retrieved as the retrieval acquired data. However, because a number of word sets retrieved at this time exceeds the predetermined number (=three word sets), the body word sets of those three word sets are not displayed yet.

Next, when the user inputs a character of "B", it means that a character string composed of two characters of "AB" is inputted, because the character "A" is inputted before. As a result, the five word sets of "ABCD", "ABCDE", "ABCDE ABCMN ABCD", "ABCDE XYZ" and "ABCMN ABCD" are retrieved as the retrieval acquisition. Therefore, at this time the body word sets of those five word sets are not displayed yet.

When the user inputs five characters of "A-B-C-D-E" one by one, the three word sets of "ABCDE", "ABCDE ABCMN ABCD" and "ABCDE XYZ" are retrieved as the retrieval acquisition data. Then, because the number of the word sets of the retrieval acquisition data is equal to or less than the predetermined number (=three), the body word sets of those three word sets are displayed for the first time at this point of time.

(2) Although the above-mentioned embodiment has been explained by exemplifying the character strings composed of alphabets, it is also possible to use a character string written in Japanese containing hiragana, katakana and kanji. In such a case, word sets of ambiguous retrieval data are stored in the external memory 15 while sorted in the order of the Japanese syllabary in creating the ambiguous retrieval data table in the external memory 15. It is also possible to use a character string written in any language characters such as Cyrillic characters and Arabic characters. In such a case, word sets of an ambiguous retrieval data are stored while sorted in the optimum order for that characters in creating the ambiguous retrieval data table in the external memory 15.

(3) In the above-described embodiment, the word sets included in the ambiguous retrieval data are sorted and stored in the external memory 15 when the ambiguous retrieval data table is created in the external memory 15. However, it is also possible to arrange such that the word sets of the ambiguous retrieval data are stored without being sorted when the ambiguous retrieval data table is created in the external memory 15 and are sorted when the ambiguous retrieval data table in the external memory 15 is retrieved in Step 110 or when the retrieval acquisition data are read in Step 140. It is to be noted that the method of sorting the word sets in Step 110 or Step 140 is applicable also to the case of (2).

(4) The data retrieving and displaying system of the present invention is applicable not only to the car navigation system but also to various systems requiring retrieval of data such as a library book management system, a customer information management system and a production information management system.

[Second Embodiment]

A second embodiment in which the present invention is embodied in a car navigation system will be explained below with reference to the drawings.

The car navigation system of the second embodiment has a structure similar to that of the first embodiment.

Figure 5A:
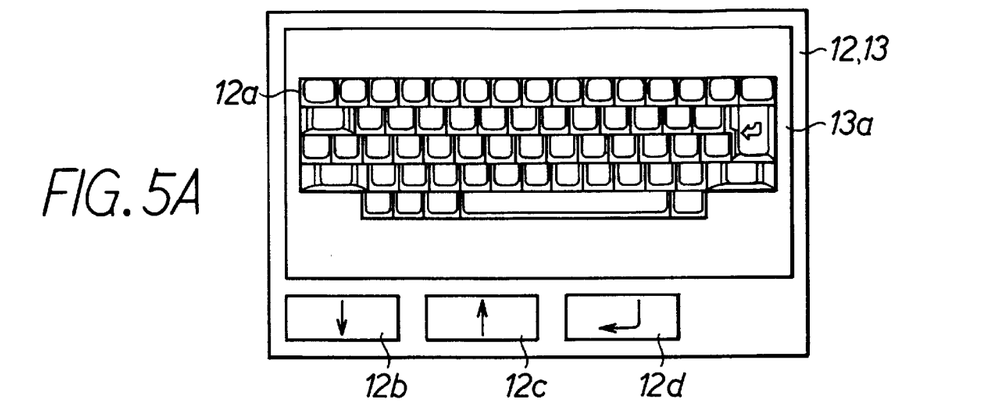
FIGS. 5A through 5C are explanatory drawings for explaining exemplary displays according to a second embodiment.
Figure 5B:
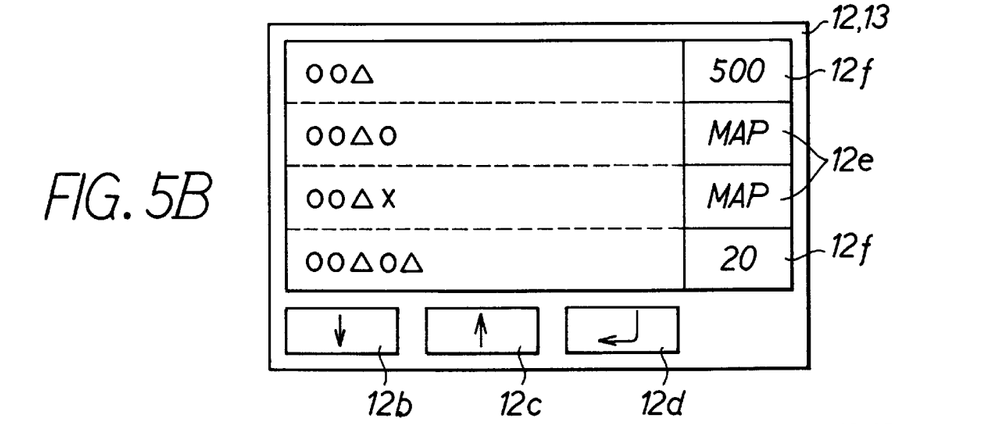
Figure 5C:
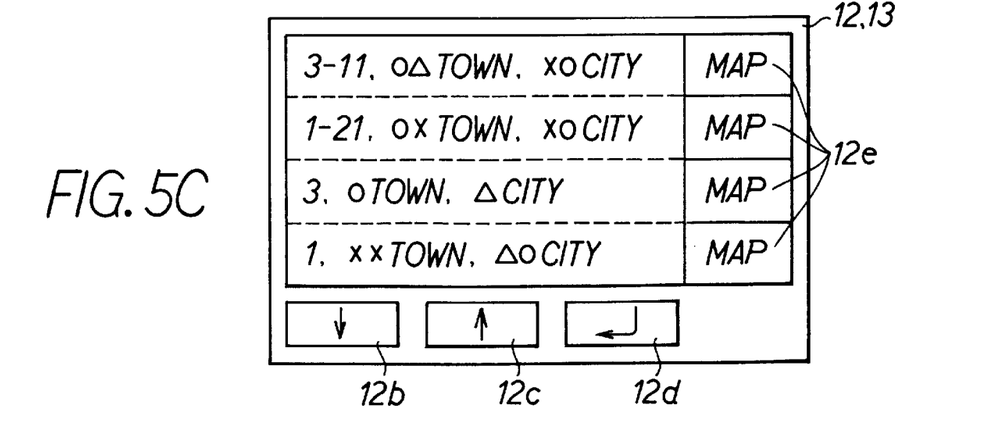

FIGS. 5A through 5C show the input plane of the touch panel 12 as well as the display screen of the display 13.

The touch panel 12 functions as a control switch for the retrieval and display controller 14 and the navigation unit 17. A keyboard 12a, control keys 12b and 12c for scrolling up and down the display screen 13a of the display 13, a confirmation key 12d for defining to execute objective retrieving processing described later to advance to the next processing or to return to the previous processing, map display keys 12e for displaying position of a selected objective on a map, address display keys 12f for displaying addresses of the selected objectives and others are provided on the input plane of the touch panel 12.

A data table in which names of objectives (buildings, facilities, parks and the like) are associated with positional data on the map of the objectives is stored in the external memory 15. In the data table, objectives having an identical name are stored while the names of the objectives are associated with their addresses, respectively.

Next, processing executed by the retrieval and display controller 14 will be explained in detail by using the explanatory drawings shown in FIGS. 5A through 5C and a flowchart shown in FIG. 6.

When the user selects a menu for retrieving positional data on a map of an objective from the name of the objective among menus displayed on the display 13 by the menu selection keys (not shown) provided on the touch panel 12 after turning on the power switch of the car navigation system 11, the retrieval and display controller 14 executes the following processing.

Figure 6:
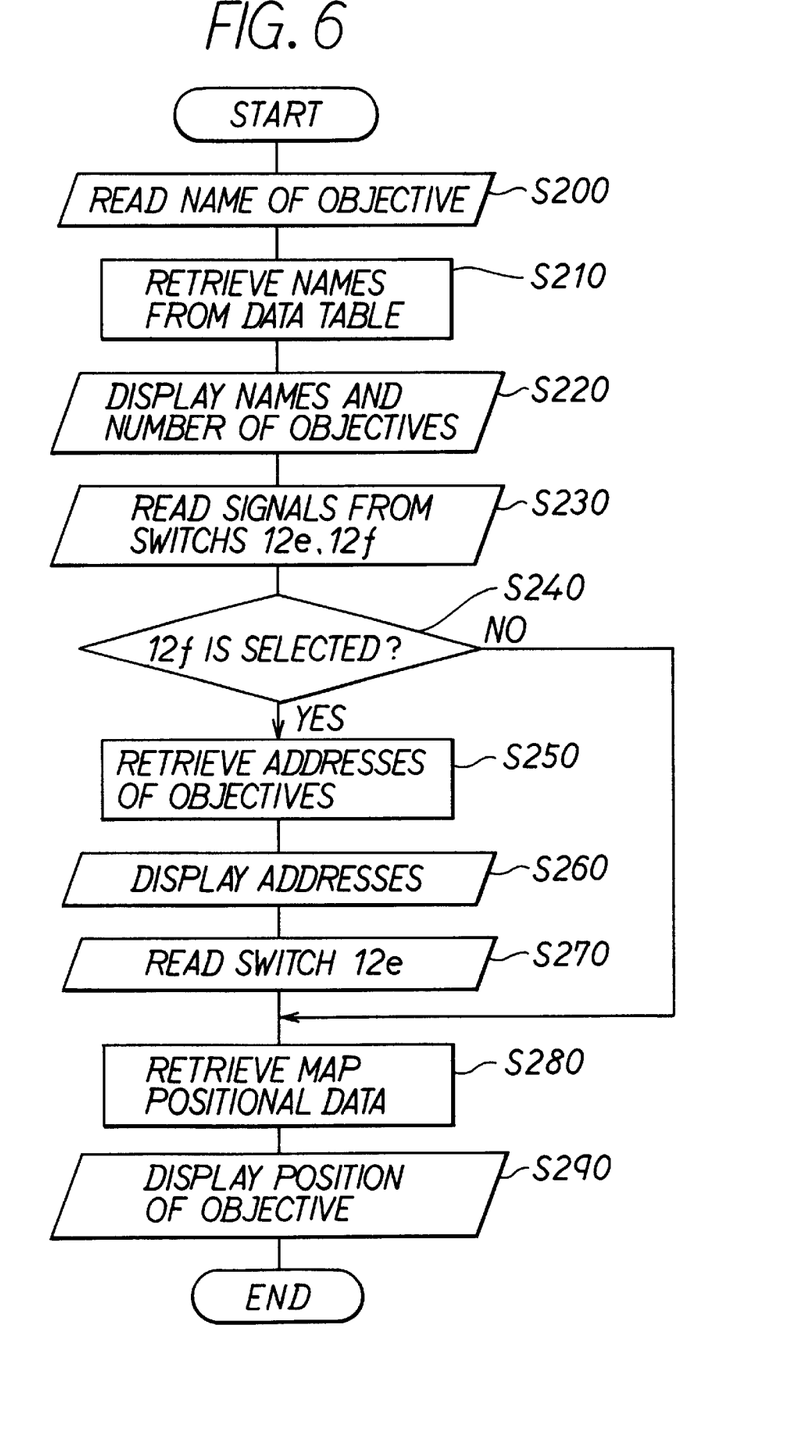
FIG. 6 is a flowchart for explaining the operation of the second embodiment.

The name of the objective inputted by the user is read in Step 200, as shown in FIG. 6. That is, the keyboard 12*a* of the touch panel 12 is displayed on the display screen 13*a* of the display 13 as shown in FIG. 5A. The name of the objective inputted by the user by touching the respective keys of the keyboard 12*a* is outputted to and read by the retrieval and display controller 14 as an output signal of the touch panel 12.

Next, names equivalent to the inputted name of the objective and all of names including the inputted name are retrieved from the data table in the external memory 15 in Step 210.

Then, the names of the objectives retrieved from the data table in the external memory 15 are tabularly displayed on the display 13. When there exist a plurality of objectives having the identical name, one name and a number of the objectives are displayed on the display 13.

For instance, when the user inputs a name "○○△" and when five hundreds chain stores having the name "○○△" are registered in the external memory 15, the name of "○○△" as well as the registered number (=500) are displayed on the display 13. Names of "○○△", "○○△X" and "○○△○△" including the name "○○△" are also displayed together with the name "○○△". When twenty objectives having the identical name of "○○△○△" are registered in the external memory 15, one of the names "○○△○△" as well as the registered number (=20) are displayed on the display 13 similarly to the case of the name "○○△".

Then, the output signal of the touch panel 12 is read in Step 230 to detect the map display key 12*e* or the address display key 12*f* of the touch panel 12 selected (touched) by the user. That is, the map display key 12*e* or the address display key 12*f* is provided next to the name of the objective displayed on the display 13. The map display key 12*e* is displayed when the number of an objective having the identical name is only one and the address display key 12*f* is displayed when there exist a plurality of objectives having the identical name. Then, the output signal from the key 12*e* or 12*f* touched and selected by the user is outputted from the touch panel 12 to the retrieval and display controller 14.

It is to be noted that, in the example shown in FIG. 5B, the address display key 12*f* is set superposing on the area for displaying the number of objectives in the display screen 13*a*.

Next, it is determined in Step 240 which of the key 12*e* and 12*f* is selected. When the address display key 12*f* is selected, processing advances to Step 250 and when the map display key 12*e* is selected, processing advances to Step 280.

In Step 250, addresses of the objectives corresponding to the touched address display key 12*f* are retrieved from the data table in the external memory 15. For instance, when the address display key 12*f* corresponding to the name "○○△" shown in FIG. 5B is touched, addresses of five hundreds objectives stored in association with the name "○○△" are retrieved from the data table in the external memory 15. When the address display key 12*f* corresponding to the name "○○△○△" is touched, addresses of twenty objectives stored in association with the name "○○△○△" are retrieved from the data table in the external memory 15.

Then, the addresses of the objectives retrieved from the data table in the external memory 15 are tabularly displayed on the display 13 in Step 260 as shown in FIG. 5C.

It is to be noted that although names or addresses of only four objectives having the identical name are displayed on the display 13 at a time in the examples shown in FIGS. 5B and 5C, the display screen 13*a* of the display 13 can be scrolled and the names or addresses of the objectives retrieved from the data table in the external memory 15 are displayed one after another by the user touching the control key 12*b* provided on the touch panel 12.

Further, the names or addresses of the objectives are sorted in the order of the Japanese syllabary or in alphabetic order when displayed on the display 13 so that the user can readily select a desired objective.

Next, the map display key 12*e* of the touch panel 12 touched by the user is read in Step 270. When the user touches the map display key 12*e* corresponding to an address "3–11, ○△Town, X○ City" as shown in FIG. 5C for example, the output signal from the map display key 12*e* is outputted from the touch panel 12 to the retrieval and display controller 14 and read thereby.

Then, the map positional data of the objective corresponding to the map display key 12*e* read in Step 230 or Step 270 is retrieved from the data table of the external memory 15 in Step 280. When the user touches the map display key 12*e* corresponding to the name "○○△○" shown in FIG. 5B, the map positional data of the objective stored in correspondence to the name "○○△○" is retrieved from the data table of the external memory 15. When the user touches the map display key 12*e* corresponding to the address "3–11, on Town, XO City" shown in FIG. 5C, the map positional data of the objective stored in association with the address "3–11, ○△Town, X○ City" is retrieved from the data table in the external memory 15.

Next, based on the map positional data of the objective retrieved from the data table in the external memory 15, the position of the objective on the map is displayed on the display 13 in Step 290.

The map positional data of the objective set by the retrieval and display controller 14 as described above is transferred to the navigation unit 17. Then, the navigation unit 17 selects the optimum route from the present position detected by the position detector 16 to the objective thus set and displays the present position, the optimum route from the present position to the objective and others on the display 13 by making reference to the map data stored in the external memory 15.

As described above in detail, the names equivalent to the name of the objective inputted by the user and the names including the inputted name are retrieved from the data table in the external memory 15. The retrieved names are tabularly displayed on the display 13 in the car navigation system 11 of the present embodiment. When there exist a plurality of objectives having the identical name at this time, one of the names and a number of the objectives are displayed together on the display 13. Then, when the user selects the plurality of objectives having the identical name by the address display key 12*f*, the addresses of the objectives are retrieved from the data table in the external memory 15. The retrieved addresses are tabularly displayed along with the map display key 12e assigned to each of them on the display 13. When the user selects an address of an arbitrary objective by the map display key 12e in succession, the map positional data of the objective is retrieved from the data table in the external memory 15. The retrieved position of the objective on the map is displayed on the display 13.

Therefore, the present embodiment allows the desired objective to be selected steadily even without knowing the official name of the objective because the inputted name of the objective as well as the names including the inputted name are tabularly displayed on the display 13 when the user retrieves the objective. When there exist a plurality of objectives having the identical name, the number of the objectives is displayed on the display 13 along with the name. As a result, the user can know the number of objectives having the identical name. Still more, because the addresses of the objectives having the identical name are tabularly displayed on the display 13, the user can select the desired objective steadily. When five hundreds chain stores having the name "○○∆" are registered in the external memory 15 for example, the addresses of the five hundreds stores are tabularly displayed on the display 13. Therefore, the user can select the objective store steadily if the user knows the address of the objective store roughly. Further, even if addresses of totally irrelevant objectives having the identical name are also tabularly displayed on the display 13, the user can select a desired objective steadily as long as the user roughly knows the address of the desired objective. As a result, even when the user is unfamiliar to the locality around the desired objective and cannot specify the position of the objective on the map, the user is able to set the position of the objective on the map simply and readily as long as the user knows the brief name of the objective and its rough address. As a result, the optimum route from the present position to the desired objective can be displayed on the display 13 by utilizing the above-mentioned function of the navigation unit 17.

It is to be noted that the present invention is not limited only to the second embodiment described above and may be embodied as follows while attaining the same action and effect with the embodiment described above.

(1) In the second embodiment, the names of only the objectives having the identical name are stored in the external memory 15 in association with to their addresses, respectively. However, it is possible to arrange so that names of all objectives are stored in association with their addresses, respectively, to be able to display an address of an arbitrary objective among all of the objectives registered in the external memory 15 on the display 13 by the address display key 12f. As a result, the addresses of all the objectives registered in the external memory 15 can be known and thereby the car navigation system 11 can be utilized as an address book.

(2) In the objective data retrieving system according to the second embodiment, a case in which when the name "○○∆" is inputted, the chain stores having the name "○○∆" is searched, is explained. However, the present invention is not limited only to such a case in the objective data retrieving system of the second embodiment. For instance, when the official name of the objective is composed of several abbreviated names (parts of the official name of the objective), the user may input only one of the abbreviated names as a name to be retrieved not the official name. When the official name of the objective is "○X○○-○X Building" and the objective is called generally as "○X○○" and "○X Building" as the abbreviated names respectively, the user can retrieve the objective by inputting either one of "○X○○" and "○X Building" as explained in the first embodiment. When the name "○X○○-○X Building" is listed, if there exist objectives having the identical names at this time, a number of registered names is displayed. Further, names including the inputted names of "○X○○" and "○X Building" are also displayed together with the name "○X○○-○X Building". Further, when there exist objectives having the identical name for each of the names displayed together, a number of registered names is displayed. Such arrangement also allows the same action and effect with the second embodiment described above to be attained.

It is to be noted that even when the names of "○X○○" and "○X Building" are included between or in the end of an official name such as "□∆○X○○□∆" and "∆X○X Building", those official names may be displayed. Further, when a name "○X○" is called in general as a brief name of a name "○X○○", the name "○X○" is stored in the data table and the user can retrieve the name "○X○○" by the name "○X○" similarly to those described above.

(3) When telephone numbers and various information (e.g., information on a menu or business hours when the objectives are restaurants or information on admission fees, side shows and opening hours when the objectives are museums) concerning on all of objectives registered in the external memory 15 may be stored beside their addresses in association with names of the objectives. As a result, because the various stored information of all of the objectives registered in the external storage 15 can be retrieved from the name of the objective, the car navigation system 11 can be utilized as a guide book.

While the preferred embodiments have been described, variations thereto will occur to those skilled in the art within the scope of the present inventive concepts which are delineated by the following claims.

What is claimed is:

1. A data retrieving and displaying system comprising:
a storage device for storing a plurality of body word sets, each of which is constituted with a word string having a plurality of words, and a plurality of duplicate word sets, each of the plurality of duplicate word sets being composed of a part of a word string of a respective body word set, and has a name identical to that of the respective body word set, wherein the plurality of body word sets and the plurality of duplicate word sets constitute ambiguous retrieval data;
a specifying device for specifying a retrieving character string;
a retrieving device for retrieving the body and the duplicate word sets which include a character string that coincides with the retrieving character string from the ambiguous retrieval data;
a display device for displaying a name; and
a selecting device for selecting one word set among one body word set and each of the plurality of duplicate word sets that has the name identical to that of the one body word set while automatically suppressing the display of the name of the one body word set together with the display of the name of the duplicate word set having the name identical to that of the one body word set, when the one body word set and at least one of the plurality of duplicate word sets are retrieved by the retrieving device, and for sending the selected one word set to the display device so that the name thereof is displayed as the name to be displayed at the display device, wherein the name of the one word set selected by the selecting device is displayed at the display device while display of a plurality of names identical to the name of the one word set are prohibited by the selecting device without selection by a user; and the storage device stores a body word set and one or more duplicate word sets corresponding to an identical name in a predetermined order, a number of overlapping characters of each of the body word and duplicate word sets is also stored in association with each of the body and duplicate word sets, the number of overlapping characters representing a number of characters of an arbitrary one of the body and duplicate word sets that match characters composing another of the body and duplicate word sets stored before the arbitrary one, from a head character thereof, and wherein the selecting device selects a word set whose number of overlapping characters is smaller than the number of characters in the retrieving character string specified through the specifying device when the body word and the duplicate word sets corresponding to the identical name are retrieved by the retrieving device.

2. A data retrieving and displaying system according to claim 1, wherein each of the duplicate word sets is composed of remaining words when at least one of head word are excluded from the body word set.

3. A data retrieving and displaying system according to claim 1, wherein the retrieving device retrieves the body word sets and the duplicate word sets including the character string that coincides with the retrieving character string from the ambiguous retrieval data by comparing each character composing the retrieving character string with each character composing each of the body word sets and the duplicate word sets one by one from a head character.

4. A data retrieving and displaying system according to claim 1, wherein each of the duplicate word sets are stored in the storage device in association with its original body word set, and wherein the display device displays the body word sets as they are when the body word sets are retrieved by the retrieving device and displays the body word sets respectively stored in association with duplicate word sets when the duplicate word sets are retrieved by the retrieving device.

5. A data retrieving and displaying system according to claim 1, wherein the body word sets and the duplicate word sets are stored in alphabetic order when the body word sets and the duplicate word sets are expressed by an alphabet.

6. A data retrieving and displaying system according to claim 1, wherein the storage device stores an attribute for each of the body word sets and the duplicate word sets, the attribute being for discriminating between the body word set and the duplicate word set.

7. A data retrieving and displaying system according to claim 6, wherein each of the body word sets and the duplicate word sets retrieved by the retrieving device is determined based on the attribute whether it is a body word set or a duplicate word set, and wherein the display device displays the body word set obtained from the storage device based on the duplicate word set when it is determined to be the duplicate word set.

8. A data retrieving and displaying system according to claim 1, wherein the data retrieving and displaying system is applied to a car navigation system.

9. A data retrieving and displaying system according to claim 1, wherein a length of a word string of each duplicate word set is shorter than that of the respective body word set.

10. A data retrieving and displaying system according to claim 1, wherein at least one of the plurality of body word sets is composed by a plurality of words, and the plurality of duplicate word sets comprises a plurality of associated duplicate word sets associated with the at least one of the plurality of body word sets, which are composed of a first associated duplicate word set having a part of the at least one of the plurality of body word sets and a second associated duplicate word set which has a remaining part of the at least one of the plurality of body word sets that exclude the part of the at least one of the plurality of body word sets.

11. A data retrieving and displaying system according to claim 1, wherein each of the plurality of body word sets is composed by a plurality of words having a character string of a predetermined length, and each of the plurality of duplicate word sets, which is associated with the respective body word set, comprises a shorter character string shorter than the character string of the predetermined length, wherein said character string of the predetermined length includes a partial character string identical to said shorter character string.

12. A data retrieving and displaying system according to claim 1, wherein the body word sets and the duplicate word sets are stored in alphabetic order when the body word sets and the duplicate word sets are expressed by an alphabet.

13. A data retrieving and displaying system according to claim 1, wherein a name corresponding to a respective body word set is composed of at least a name of a building and a name of a facility.

14. A data retrieving and displaying system comprising:

a storage device for storing a first body word set having a first plurality of words constituting a first name, a first duplicate word set relating to the first name which is composed of a part of the first plurality of words of the first body word set, a second body word set having a second plurality of words constituting a second name and a second duplicate word set relating to the second name which is consisted of a part of the second plurality of words of the second body word set;

a specifying device for specifying a retrieving character string;

a retrieving device for retrieving a retrieved body word set including a character string that coincides with the retrieving character string and a retrieved duplicate word set including a character string that coincide with the retrieving character string from the storage device;

a display device capable of displaying the first and second names;

a display control device for displaying only one first name so as to represent the first body word set and the first duplicate word set while automatically suppressing the display of the first name of the first body word set and the first name of the first duplicate word set, when the first body and duplicate word sets include the character string that coincides to the retrieving character string and are retrieved by the retrieving device; wherein the storage device stores the first body word set and associated duplicate word sets corresponding to an identical name in a predetermined order, a number of overlapping characters of each of the first body word and associated duplicate word sets is also stored in association with each of the first body word and associated duplicate word sets, the number of overlapping characters representing a number of characters of an arbitrary one of the first body and associated duplicate word sets that match characters composing another of the first body word and associated duplicate word sets stored before the arbitrary one, from a head character thereof, and wherein the display control device selects a word set whose number of overlapping characters is smaller than the number of characters in the retrieving character string specified through the specifying device when the first body word and associated duplicate word sets corresponding to the identical name and retrieved by the retrieving device.

15. A data retrieving and displaying system according to claim 14, wherein the display device displays only one second name so as to represent the second body word set and the second duplicate word set, when the second body and duplicate word sets have the character string that coincide to the retrieving character string and are retrieved by the retrieving device.

16. A data retrieving and displaying system according to claim 14, wherein a length of a word string of respective first and second duplicate word sets is shorter than that of the respective first and second body word sets.

17. A data retrieving and displaying system according to claim 14, wherein said first duplicate word set comprises a plurality of associated duplicate word sets associated with the first body word sets, which are composed of a first associated duplicate word set having a part of the first body word set and a second associated duplicate word set which has a remaining part of the first body word set that exclude the part of the first body word set.

18. A data retrieving and displaying system according to claim 14, wherein said first body word set is composed by a plurality of words having a character string of a predetermined length, and said first duplicate word set comprises a shorter character string shorter than the character string of the predetermined length, wherein said character string of the predetermined length includes a partial character string identical to said shorter character string.

19. A data retrieving and displaying system according to claim 14, wherein the retrieving device retrieves the first body word set and the first duplicate word set including the character string that coincides with the retrieving character string from the ambiguous retrieval data by comparing each character composing the retrieving character string with each character composing each of the first body word set and the first duplicate word set one by one from a head character.

20. A data retrieving and displaying system according to claim 14, wherein the first and second body word sets and the first and second duplicate word sets are stored in alphabetic order when the body word sets and the duplicate word sets are expressed by an alphabet.

21. A data retrieving and displaying system according to claim 14, wherein a name corresponding to a respective first and second body word sets is composed of at least a name of a building and a name of a facility.

22. A data retrieving and displaying system comprising:
- a storage device for storing a plurality of body word sets and a plurality of duplicate word sets, each of the plurality of duplicate word sets being composed of a part of a respective body word set;
- a specifying device for specifying a retrieving character string;
- a retrieving device for retrieving one or more retrieved body word sets from the plurality of body word sets which include a character string that coincides with the retrieving character string and one or more retrieved duplicate word sets from the plurality of duplicate word sets which include a character string that coincides with the retrieving character string from the storage device;
- a display device capable of displaying the one or more retrieved body word sets retrieved by the retrieving device and one or more associated body word sets associated with the one or more retrieved duplicate word sets retrieved by the retrieving device; and
- a display control device for displaying only one of the retrieved and associated body word sets while automatically suppressing the display of the retrieved body word and associated body word sets, when the retrieved and associated body word sets are the same without an arrangement by a user; wherein
- the storage device stores a body word set and one or more duplicate word sets corresponding to an identical name in a predetermined order, a number of overlapping characters of each of the body word and duplicate word sets is also stored in association with each of the body and duplicate word sets, the number of overlapping characters representing a number of characters of an arbitrary one of the body and duplicate word sets that match characters composing another of the body and duplicate word sets stored before the arbitrary one, from a head character thereof, and wherein the display control device selects a word set whose number of overlapping characters is smaller than the number of characters in the retrieving character string specified through the specifying device when the body word and duplicate word sets corresponding to the identical name are retrieved by the retrieving device.

23. A data retrieving and displaying system comprising:
- a storage device for storing a plurality of body word sets and a plurality of duplicate word sets, each of the plurality of duplicate word sets being composed of a part of a respective body word set;
- a specifying device for specifying a retrieving character string;
- a retrieving device for retrieving one or more retrieved body word sets from the plurality of body word sets which include a character string that coincides with the retrieving character string and one or more retrieved duplicate word sets from the plurality of duplicate word sets which include a character string that coincides with the retrieving character string from the storage device;
- a display device capable of displaying the one or more retrieved body word sets retrieved by the retrieving device and one or more associated body word sets associated with the one or more retrieved duplicate word sets retrieved by the retrieving device; and
- a display control device for displaying only one of the retrieved and associated body word sets while automatically suppressing the display of the retrieved body word and associated body word sets, when the retrieved and associated body word sets are the same without an arrangement by a user;
- wherein at least one of the plurality of body word sets is composed by a three or more words, and the plurality of duplicate word sets comprises a plurality of associated duplicate word sets associated with the at least one of the plurality of body word sets, which are composed of a first associated duplicate word set having a part of the at least one of the plurality of body word sets and a second associated duplicate word set which has a remaining part of the at least one of the plurality of body word sets that exclude the part of the at least one of the plurality of body word sets.

24. A data retrieving and displaying method according to claim 22, further comprising, displaying only one second name so as to represent the second body word set and the second duplicate word set, when the second body and duplicate word sets have the character string that coincides to the retrieving character string and are retrieved by the retrieving device.

25. A data retrieving and displaying system according to claim 22, wherein each of the plurality of body word sets is composed by a plurality of words having a character string of a predetermined length, and each of the plurality of duplicate word sets, which is associated with the respective body word set, comprises a shorter character string shorter than the character string of the predetermined length, wherein said character string of the predetermined length includes a partial character string identical to said shorter character string.

26. A data retrieving and displaying system according to claim 22, wherein the retrieving device retrieves the body word sets and the duplicate word sets including the character string that coincides with the retrieving character string from the ambiguous retrieval data by comparing each character composing the retrieving character string with each character composing each of the body word sets and the duplicate word sets one by one from a head character.

27. A data retrieving and displaying system according to claim 22, wherein the body word sets and the duplicate word sets are stored in alphabetic order when the body word sets and the duplicate word sets are expressed by an alphabet.

28. A data retrieving and displaying system according to claim 22, wherein a name corresponding to a respective body word set is composed of at least a name of a building and a name of a facility.

29. A data retrieving and displaying method comprising:
  storing a first body word set having a plurality of words constituting a first name, a first duplicate word set which is composed of a part of the plurality of words of the first body word set and is related to the first name, a second body word set having a plurality of words constituting a second name and a second duplicate word set which is composed of a part of the plurality of words of the second body word set;
  specifying a retrieving character string;
  retrieving a body word set including a character string that coincides with
  the retrieving character string and a duplicate word set including a character string that coincide with the retrieving character string from the storage device;
  displaying only one first name so as to represent the first body word set and the first duplicate word set while automatically suppressing the display of the first name of the first body word set and the first name of the first duplicate word set, when the first body and duplicate word sets include a character string identical to the retrieving character string and are retrieved by the retrieving device;
  wherein the storage device stores the first body word set and associated duplicate word sets corresponding to an identical name in a predetermined order, a number of overlapping characters of each of the first body word and associated duplicate word sets is also stored in association with each of the first body word and associated duplicate word sets, the number of overlapping characters representing a number of characters of an arbitrary one of the first body and associated duplicate word sets that match characters composing another of the first body word and associated duplicate word sets stored before the arbitrary one, from a head character thereof, and wherein the display control device selects a word set whose number of overlapping characters is smaller than the number of characters in the retrieving character string specified through the specifying device when the first body word and associated duplicate word sets corresponding to the identical name are retrieved by the retrieving device.

30. A data retrieving and displaying method according to claim 29, wherein a length of a word string of each of the plurality of duplicate word sets is shorter than that of the respective body word set.

31. A data retrieving and displaying system according to claim 29, wherein a length of a word string of respective first and second duplicate word sets is shorter than that of the respective first and second body word sets.

32. A data retrieving and displaying method according to claim 29, wherein said first duplicate word set comprises a plurality of associated duplicate word sets associated with the first body word sets, which are composed of a first associated duplicate word set having a part of the first body word set and a second associated duplicate word set which has a remaining part of the first body word set that exclude the part of the first body word set.

33. A data retrieving and displaying method according to claim 29, wherein said first body word set is composed by a plurality of words having a character string of a predetermined length, and said first duplicate word set comprises a character string shorter than the character string of the predetermined length, wherein said character string of the predetermined length includes a partial character string identical to said shorter character string.

34. A data retrieving and displaying method according to claim 29, wherein the retrieving device retrieves the first body word set and the first duplicate word set including the character string that coincides with the retrieving character string from the ambiguous retrieval data by comparing each character composing the retrieving character string with each character composing each of the first body word set and the first duplicate word set one by one from a head character.

35. A data retrieving and displaying method according to claim 29, wherein the first and second body word sets and the first and second duplicate word sets are stored in alphabetic order when the body word sets and the duplicate word sets are expressed by an alphabet.

36. A data retrieving and displaying method according to claim 29, wherein a name corresponding to a respective first and second body word sets is composed of at least a name of a building and a name of a facility.

* * * * *